(12) United States Patent
Bergman et al.

(10) Patent No.: US 8,489,138 B2
(45) Date of Patent: Jul. 16, 2013

(54) METHOD AND APPARATUS FOR UPLINK POWER CONTROL DURING SOFT HANDOVER

(75) Inventors: Johan Bergman, Stockholm (SE); Carmela Cozzo, San Diego, CA (US); Christer Edholm, Täby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 638 days.

(21) Appl. No.: 12/517,859

(22) PCT Filed: Mar. 20, 2008

(86) PCT No.: PCT/SE2008/050322
§ 371 (c)(1),
(2), (4) Date: Jun. 5, 2009

(87) PCT Pub. No.: WO2008/118081
PCT Pub. Date: Oct. 2, 2008

(65) Prior Publication Data
US 2010/0298021 A1    Nov. 25, 2010

(30) Foreign Application Priority Data
Mar. 26, 2007  (SE) .................................. 0700751

(51) Int. Cl.
| | |
|---|---|
| H04B 1/00 | (2006.01) |
| H04B 7/00 | (2006.01) |
| H04B 1/04 | (2006.01) |
| H01Q 11/12 | (2006.01) |
| H04W 36/00 | (2009.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04M 3/00 | (2006.01) |
| H04M 5/00 | (2006.01) |

(52) U.S. Cl.
USPC .......... 455/522; 455/69; 455/127.1; 455/442; 370/252; 370/311; 370/335; 375/130; 379/332

(58) Field of Classification Search
USPC ........... 455/13.4, 69, 70, 84, 125, 126, 127.1, 455/127.2, 134, 136, 137, 138, 404.1, 404.2, 455/405, 418, 419, 420, 442, 447, 452.1, 455/452.2, 455, 456.1, 456.2, 515, 517, 522, 455/63.1, 422.1, 426.2, 436, 437, 439; 370/203, 370/204, 208, 229, 230, 280, 244, 310, 318, 370/320, 328, 331, 332, 334, 335, 336, 337, 370/342, 348, 394, 395.4, 473, 506, 216, 370/252, 253, 311, 312, 329, 341, 349, 391, 370/441, 465, 468; 375/141, 227, 377, 130; 379/332
See application file for complete search history.

(56) References Cited

U.S. PATENT DOCUMENTS 5,603,096 A * 2/1997 Gilhousen et al. .............. 455/69
5,822,318 A * 10/1998 Tiedemann et al. .......... 370/391
(Continued)

FOREIGN PATENT DOCUMENTS

| EP | 1061668 B1 | 8/2004 |
|---|---|---|
| WO | 0124402 A1 | 4/2001 |

OTHER PUBLICATIONS
International Search Report for PCT/SE2008/050322 mailed Sep. 9, 2008.
3GPP, "3rd Generation Partnership Project; Technical Specification Group Radio Access Network; Physical Layer procedures (FDD) (Release 6)," 3GPP TS 25.214 v6.0.0, Dec. 2003, pp. 1-64.
(Continued)

*Primary Examiner* — Andrew Wendell
*Assistant Examiner* — Paul P Tran
(74) *Attorney, Agent, or Firm* — Potomac Patent Group, PLLC

(57) ABSTRACT

The present invention provides a solution for maintaining a reliable power control in a telecommunications network during soft handover between a serving and non serving base station when a dedicated physical control channel power is boosted due to an increased data rate.

2 Claims, 6 Drawing Sheets

U.S. PATENT DOCUMENTS

| | | | |
|---|---|---|---|
| 6,173,162 B1 * | 1/2001 | Dahlman et al. | 455/69 |
| 6,529,482 B1 * | 3/2003 | Lundby | 370/252 |
| 6,639,934 B1 * | 10/2003 | Engstrom et al. | 375/130 |
| 6,904,290 B1 * | 6/2005 | Palenius | 455/522 |
| 7,167,719 B2 * | 1/2007 | Agin | 455/522 |
| 2003/0039217 A1 * | 2/2003 | Seo et al. | 370/318 |
| 2003/0185193 A1 * | 10/2003 | Choi et al. | 370/348 |
| 2003/0210668 A1 * | 11/2003 | Malladi et al. | 370/335 |
| 2003/0232622 A1 * | 12/2003 | Seo et al. | 455/437 |
| 2005/0111476 A1 * | 5/2005 | Gu | 370/441 |

OTHER PUBLICATIONS

International Preliminary Report on Patentability for PCT/SE2008/050322 mailed Apr. 6, 2009.

3GPP, "3rd Generation Partnership Project; Technical Specification Group Radio Access Network; Medium Access Control (MAC) protocol specification (Release 6)," 3GPP TS 25.321 v6.0.0, Dec. 2003, pp. 1-61.

* cited by examiner

METHOD AND APPARATUS FOR UPLINK POWER CONTROL DURING SOFT HANDOVER

RELATED APPLICATIONS

This application claims priority and benefit from International Application No. PCT/SE2008/050322, filed Mar. 20, 2008, which claims priority to Swedish patent application No. 0700751-1, filed Mar. 26, 2007, the entire teachings of which are incorporated herein by reference.

TECHNICAL FIELD

The present invention relates to a solution for uplink power control in a cellular telecommunication network. In particular, the present invention relates to a method and an arrangement for uplink power control during soft handover conditions.

BACKGROUND

High-Speed Packet Access (HSPA) is a collection of mobile telephony protocols that extend and improve the performance of existing Universal Mobile Telephony System (UMTS) protocols. Two standards, High-Speed Downlink Packet Access and High-Speed Uplink Packet Access also referred to as Enhanced Uplink (EUL) have been established. The enhanced uplink introduces a new transport channel, the Enhanced Dedicated Channel (E-DCH). A dedicated channel (DCH) is assigned to only one UE at a time. The DCHs are power controlled which implies that the transmitter power is increased if the channel is too poor and the power is reduced if an unnecessary high power level is used.

At the physical layer, the Enhanced Uplink introduces e.g. the E-DCH Dedicated Physical Control Channel (E-DPCCH) and the E-DCH Dedicated Physical Data Channel (E-DPDCH). The E-DPDCH is used to carry the E-DCH transport channel and the E-DPCCH is used to carry the control information associated with the E-DCH such as the E-DCH Transport Format Combination Indicator (E-TFCI). The Dedicated Physical Control Channel DPCCH is used to carry pilot symbols used for channel estimation.

To increase the data rate in the uplink, higher order modulation (HOM) based on 16 QAM (Quadrature Amplitude Modulation) is introduced to the uplink E-DCH. The introduction of 16 QAM doubles the data rate with respect to Release 6 of the 3GPP specifications concerning Enhanced Uplink and allows peak data rates up to 11.5 Mbps (with coding rate equal 1). The transmission power of the data channel, E-DPDCH, depends on the transport format used and is adjusted relative to the DPCCH power. The DPCCH power is set by the inner power control loop to reach the SIR target set by the outer loop power control.

The Open loop power control is the ability of the User Equipment (UE) transmitter to set its output power to a specific value. It is used for setting initial uplink and downlink transmission powers when a UE is accessing the network. The Inner loop power control (also called fast closed loop power control) in the uplink is the ability of the UE transmitter to adjust its output power in accordance with one or more Transmit Power Control (TPC) commands received in the downlink, in order to keep the received uplink Signal-to-Interference Ratio (SIR) at a given SIR target.

Reliable demodulation of high rate signals requires a good phase reference (by using pilot symbols for channel estimation. It has been shown that the current power settings in Release 6 of the 3GPP specifications are not sufficient to guarantee good performance. A better phase reference can be obtained by scaling the control channel (DPCCH) power according to the transport block size which indicates the current bit rate, wherein the transport blocks are transmitted by the E-DPDCH. The DPCCH is then transmitted at higher power for high data rate transmission. The DPCCH carries pilot symbols that are used as a phase reference for channel estimation as illustrated in FIG. 1.

FIG. 1 illustrates a network comprising a plurality of radio base stations 110a,b,c connected to a radio network controller (RNC) 100. The radio base stations 110a,b,c are adapted to communicate wirelessly with the UEs 120 (only one UE is illustrated). One UE 120 may be connected to more than one radio base station simultaneously referred to as soft handover (SHO) as illustrated in FIG. 1.

Assume that the boosting of the DPCCH transmission power when high data rates are transmitted is applied. A problem with the power control loop arises when the UE is in SHO. Consider the case when the UE 120 is in SHO with a first base station 110a and a second base station 110b. The first base station 110a is the serving base station, i.e. the first base station 110a is responsible for the scheduling of the user. The UE 120 increases the power of DPCCH according to the transmission data rate negotiated with the first base station 110a. The second base station 110b has no knowledge that the UE 120 has boosted its power and the SIR target at the second base station 110b will be set at a value lower than the correct value. The power control loop with the second base station 110b then will react to the increased received DPCCH power by sending "down" power commands to the UE 120. Since the UE 120 listens to the power control commands of both base stations 110a,b and acts according to the "OR of the down commands", the power is lowered as soon as at least one TPC indicates a lower power. Thus, the UE 120 will lower the transmitted power even when the serving base station commands otherwise.

Hence, the problem is the generation of incorrect power control commands sent by the non-serving base station which is not aware of that the UE has boosted the DPCCH power. This leads to a too low receive power, and to an increased probability that transport blocks cannot be correctly decoded. Hence the system capacity is degraded.

To address this problem, it has been proposed that the UE should not act on the power control commands from the non-serving base stations for 2 or 3 time slots when boosting or lowering the power of DPCCH according to the granted rate. Or, according to an alternative solution, the UE should not act on any of the received power control commands for a few slots if the boosting of DPCCH is set according to the actual transmitted rate. The drawbacks of these proposals is that the convergence time for the SIR target value may be longer than the required time for the UE to ignore its power commands according to the prior art solution above. Furthermore, the power control procedure of these proposals is user dependent and can create instability in the system.

SUMMARY

Thus, the object of the present invention is to achieve an improved solution for handling power control during soft handover when the UE power on the DPCCH is boosted.

The present invention relates to the determination of the amount of DPCCH boosting from an estimate of the UE transmission data rate in order to be able to adjust the SIR target at the non-serving base station. The power control commands sent to the UE are then processed according to the procedures of prior art, independently if the UE is in SHO or not.

In accordance with a first aspect of the present invention, a method for a radio base station of a mobile telecommunication network for controlling power of a DPCCH, used by a UE, connected to said radio base station is provided. The UE is configured to transmit data on one or several Dedicated Physical Data Channels, (E-DPDCH) and to transmit reference information for channel estimation on a DPCCH. In the method a first SIR target (SIR target A) for the DPCCH power used by said UE is used. A change of the UE data transmission rate on the E-DPDCH is detected, and the SIR target for the DPCCH power received from the UE is adjusted from a first SIR target (SIR target A) to a second SIR target (SIR target B). The adjustment is based on a pre-determined mapping between a new UE data transmission rate and the SIR target.

In accordance with a second aspect of the present invention, a radio base station of a mobile telecommunication network for controlling power of a DPCCH used by a UE connected to said radio base station is provided. The UE is configured to transmit data on one or several Dedicated Physical Data Channels, E-DPDCH and to transmit reference information for channel estimation on a DPCCH. The radio base station comprises means for using a first SIR target (SIR target A) for the DPCCH power used by said UE and means for detecting a change of the UE data transmission rate on the E-DPDCH. In addition, means for adjusting the SIR target for the DPCCH power received from the UE is adjusted from a first SIR target (SIR target A) to a second SIR target (SIR target B) are provided. The adjustment is based on a pre-determined mapping between a new UE data transmission rate and the SIR target.

Hence the advantage with the embodiments of the present invention is that the problem of maintaining a reliable power control when the UE is in SHO and that the DPCCH power is boosted according to the data rate. If the present invention would not be used, the non-serving radio base station would not be aware of that the DPCCH power was boosted and may therefore generate incorrect power control commands.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION

Figure 1:
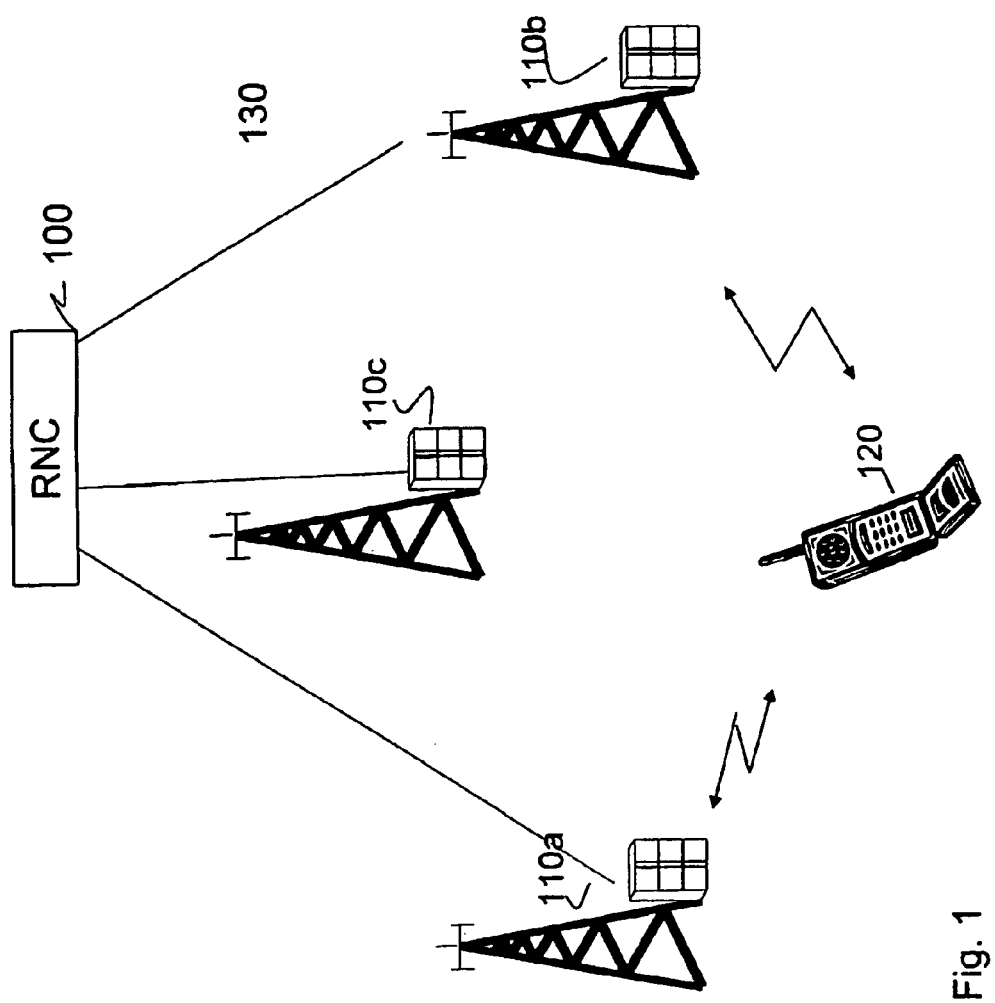
FIG. 1 illustrates schematically a network wherein the embodiments of the present invention may be implemented.

In FIG. 1, reference numeral 130 generally refers to a cellular telecommunication network wherein the present invention may be implemented. At least one mobile unit (referred to as a user equipment, UE) 120 may be connected wirelessly to the radio network controller (RNC) 100 via one or more base stations 110a,b,c. If the UE 120 is connected to the RNC via more than one base station 110a,b,c, one 110a of the base stations acts as a serving base station and the other 110b acts as a non-serving base station to the UE 120. The serving base station 110a is responsible for scheduling, rate control etc. However, both the serving 110a and the non-serving base station 110b send transmit power control (TPC) commands to the UE 120.

The present invention will now be discussed by the exemplary embodiments described below.

Consider a UE 120 which is in SHO with a first base station 110a and a second base station 110b. The first base station 110a is the serving base station and the second base station 110b is the non-serving base station and the UE 120 is transmitting at a certain rate $r_A$. A change in UE transmission rate occurs and a new negotiated higher data rate $r_B$ wherein $r_B>r_A$ with the first base station 110a is established. (In this specification a data rate increase is assumed, but the same principles can be applied in case of a data rate decrease.). The UE 120 transmits then at rate $r_B$. The DPCCH transmission power is increased accordingly when transmitting at the higher rate $r_B$. The non-serving base station 110b has the SIR target set to $SIR_{targetA}$. When transmission at rate $r_B$ starts, the measured $SIR_{meas}$ at the second base station 110b is compared to the $SIR_{targetA}$ which was computed for the lower rate transmission ($r_B$) and can be lower than $SIR_{meas}$ independently of the quality of the link.

Figure 4:
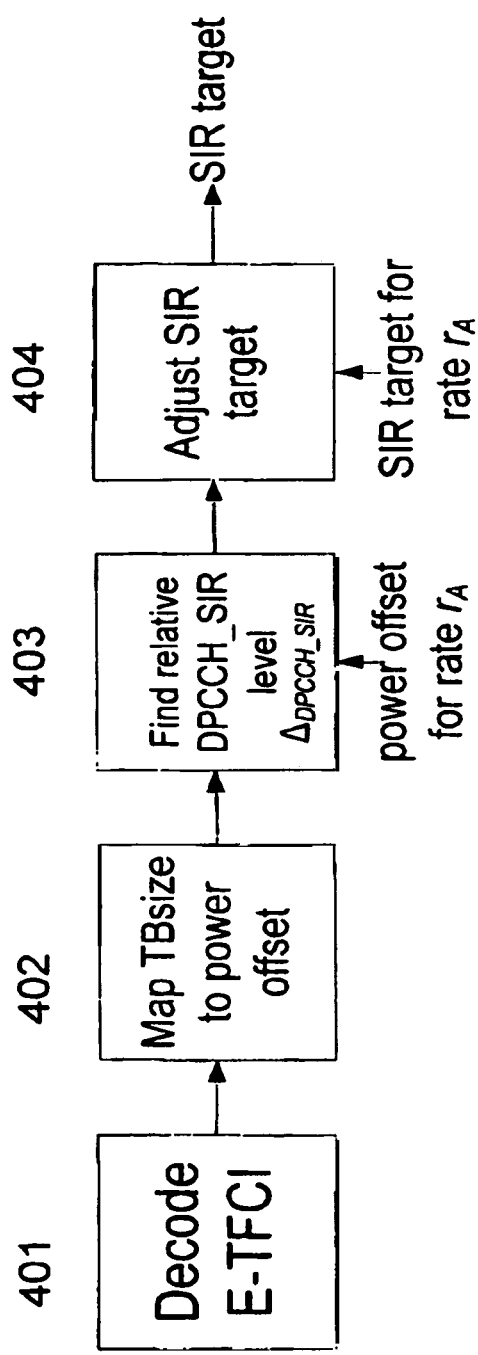
FIG. 4 illustrates schematically in a block diagram a method according to an embodiment of the present invention.

The non-serving base station 110b retrieves information of the transport block size by decoding the E-TFCI as illustrated in step 401 of FIG. 4. The transport block size indicates the data rate and the DPCCH target SIR may then be scaled according to the amount of DPCCH power boosting required for that data rate as shown in step 402. For each E-TFCI, or alternatively for each transport block size, the base station has knowledge of the power offset between E-DPDCH and DPCCH, and the DPCCH SIR target. The non-serving base station then computes the difference in DPCCH SIR between the two rates, $\Delta_{DPCCH\_SIR}$ (step 403), and corrects the SIR target (step 404), i.e.

$$SIR_{targetB}=SIR_{targetA}+\Delta_{DPCCH\_SIR}$$

A power control command is then generated as follows:
If $SIR_{meas}>\Delta_{DPCCH\_SIR}+SIR_{targetA}$ then a down transmit power command (TPC) is transmitted.
If $SIR_{meas}<\Delta_{DPCCH\_SIR}+SIR_{targetA}$ then an up transmit power command (TPC) is transmitted.

The above described embodiment is described assuming that the UE 120 boosts the power of the DPCCH according to the granted rate. In the scenario below, the serving base station 110a has knowledge of the transmitted transport block size and the granted rate, and adjusts the DPCCH SIR target accordingly.

If the UE 120 boosts the DPCCH power according to the actual transmission rate rather than according to the granted rate, both the serving 110a and the non-serving base station 110b may decode the E-TFCI and can then adjust the SIR target in accordance with the corresponding transport block (TB) size (i.e. in accordance with the data rate). This could be performed when all slots in a Transmission Time Interval (WI) have been received, which implies a delay of three slots. In accordance with a further alternative, both the serving 110a and the non-serving base station 110b may estimate the transmitted TB size from the physical channel power levels and then adjust the SIR target in accordance with this TB size. This can already be performed before the entire TTI has been received. Hence a delay shorter than three slots is possible with this alternative. In accordance with a yet further alternative, it may be assumed that the received TB size, or the E-TFCI) is the same as the one sent in the previous TTI. This alternative results in no delay. Furthermore, the serving base station may assume that the received TB size is the same as the TB size that the base station has scheduled the UE to transmit with. This implies no delay. A combination of these above described approaches may also be applied.

Figure 2A:
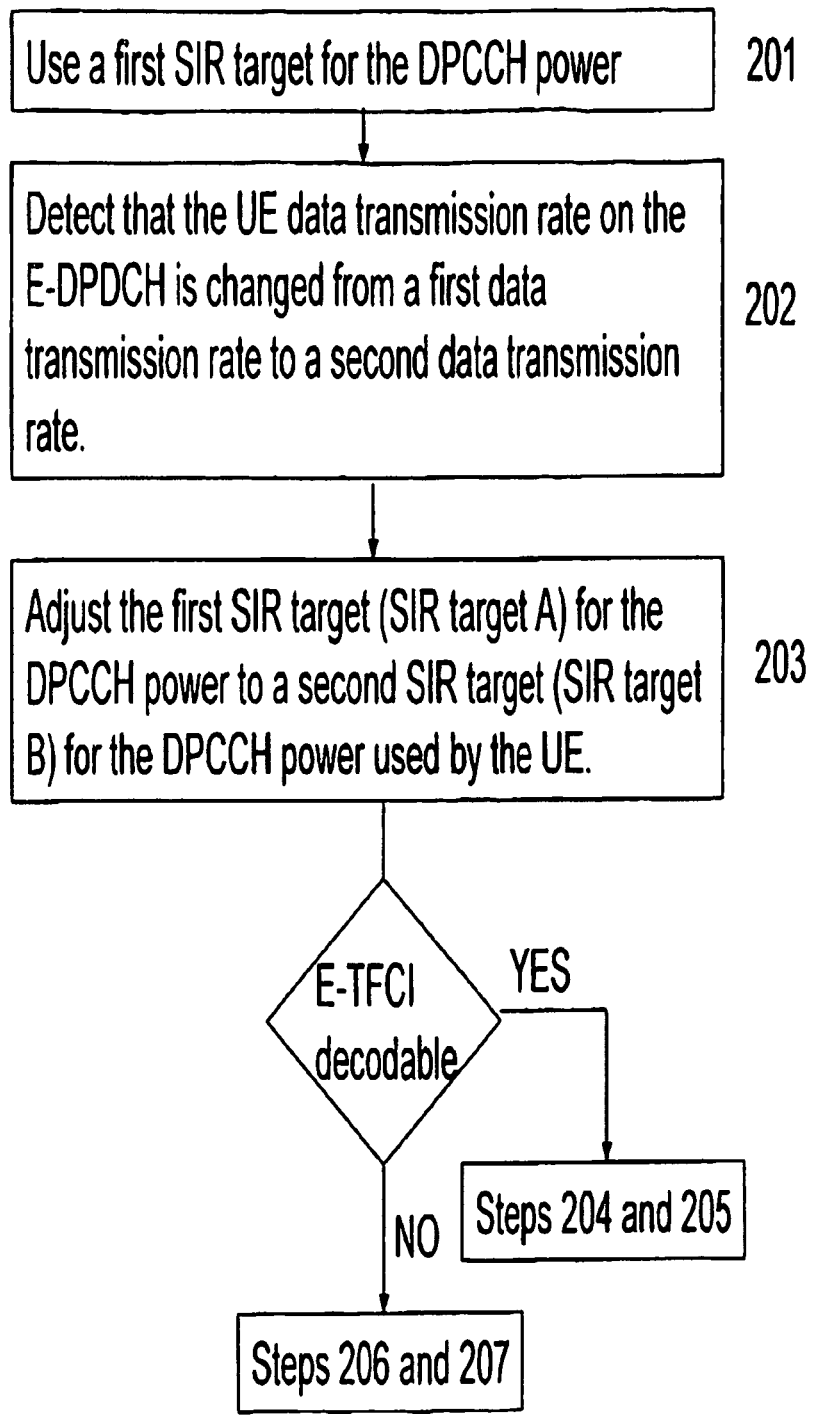
FIGS. 2a and 2b illustrates schematically a flowchart of the method according to embodiments of the present invention.
Figure 2B:
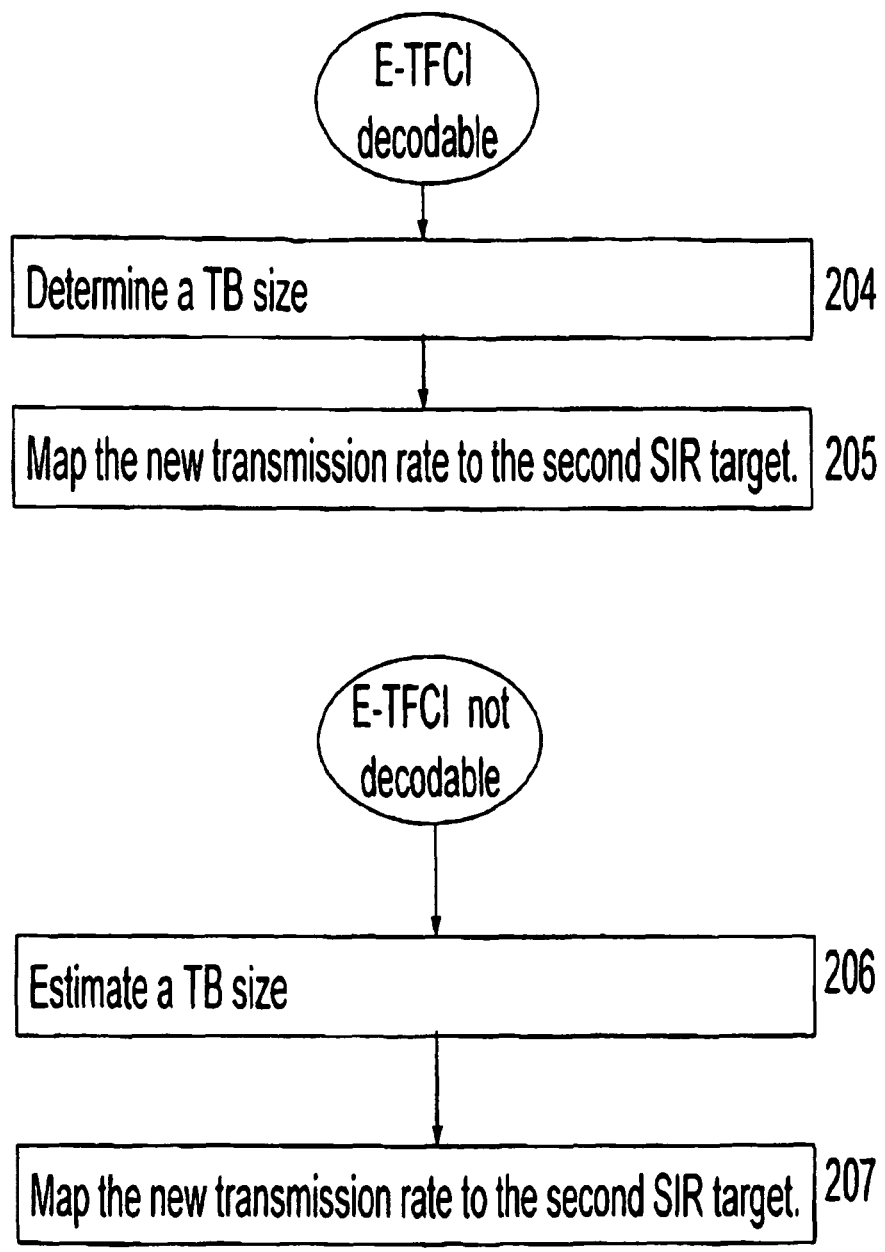

Hence, an embodiment of the present invention relates to a method for a radio base station of a mobile telecommunication network for controlling power of a DPCCH, used by a UE connected to the radio base station. The radio base station acts as a non-serving radio base station which implies that the UE is also connected to a further radio base station acting as a serving radio base station. The UE is configured to transmit data on one or several E-DPDCH and to transmit reference information for channel estimation on a DPCCH. The method is illustrated by the flowchart of FIGS. 2a and 2b and comprises the steps of:

201. Use a first SIR target (SIR target A) for the DPCCH power used by said UE.
202. Detect that the UE data transmission rate on the E-DPDCH is changed from a first data transmission rate to a second data transmission rate.
203. Adjust the first SIR target (SIR target A) for the DPCCH power to a second SIR target (SIR target B) for the DPCCH power used by the UE. The SIR target is adjusted based on a pre-determined mapping between the new UE data transmission rate, i.e. second data transmission rate, and the SIR target.

If the E-TFCI can be decoded correctly, the step 203 may comprise the further steps of:
204. Determine a Transport Block size indicative of the data transmission rate for the transmitted data.
205. Map the new transmission rate to the second SIR target.

It should however be noted that the steps above also are applicable for a radio base station acting as a serving radio base station, which is further described below.

In some cases the E-TFCI may not be decoded correctly. When the E-TFCI is not decoded correctly at the non-serving base station, the step 203 comprises the further steps of:
206. Estimate a Transport Block size indicative of the data transmission rate for the transmitted data as the Transport Block size of a previously sent Transport Block.
207. Map the new transmission rate to the second SIR target.

Two possible alternatives are described below for this scenario.

In the first alternative, the non-serving base station receives the signal at very low power and is unable to decode E-TFCI. In this alternative the measured DPCCH SIR is lower than the target SIR and the non-serving base station will send a TPC command "up". This is not a problem since the serving base station would control the power control loop.

In the second alternative, the non-serving base station is unable to decode the E-TFCI correctly but the received power is high enough such that the DPCCH SIR is higher than the SIR target. The non-serving base station will send a TPC command "down" and destroy the power control loop of the serving base station.

Figure 5:
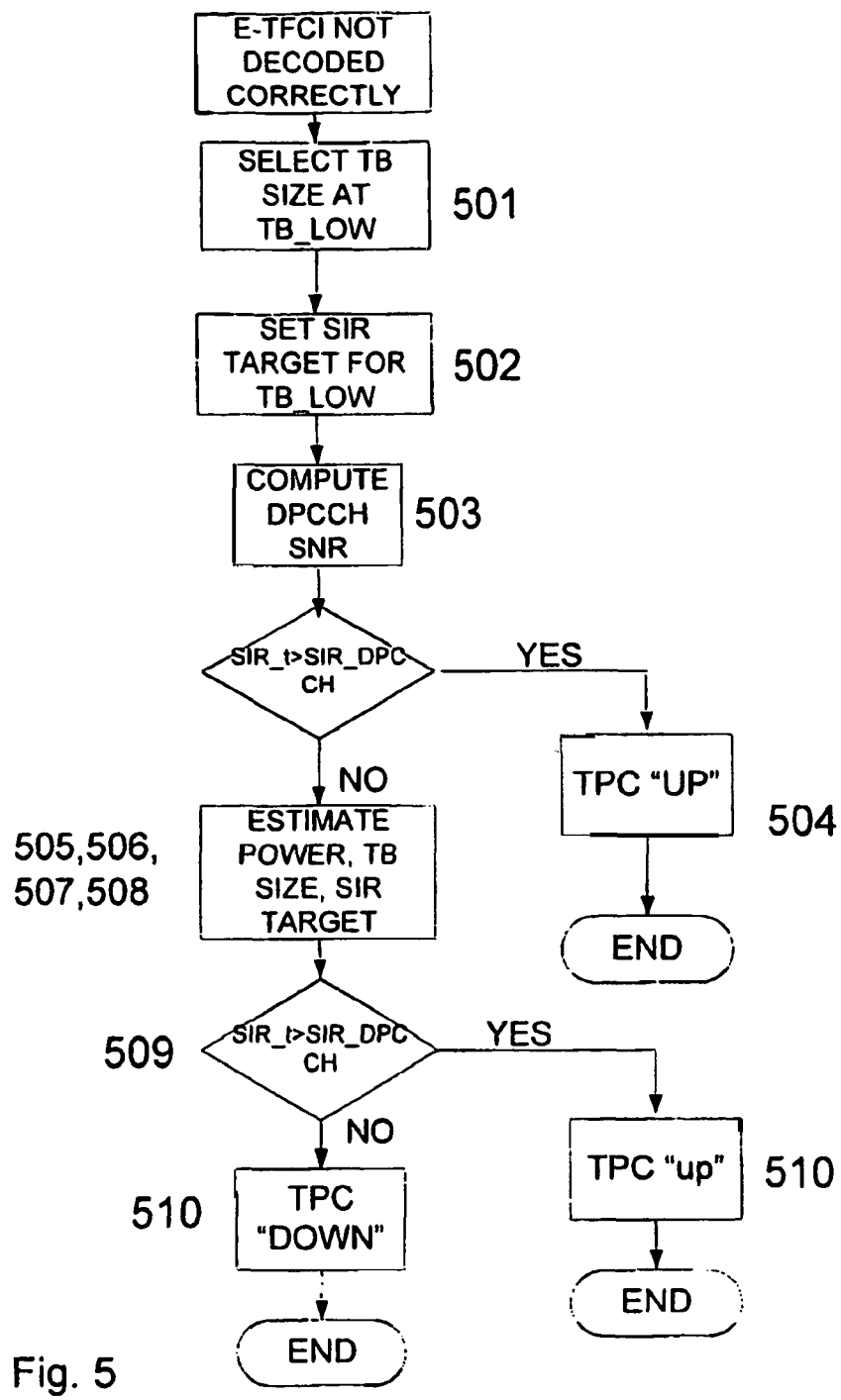
FIG. 5 illustrates schematically in a block diagram a method according to an embodiment of the present invention.

Furthermore, the following method as illustrated in FIG. 5 may be used to estimate the TB size when the E-TFCI is not correctly decoded at the non-serving base station:
501. Select the lowest TB size is selected.
502. Set a SIR target according to the selected TB size.
503. Compute the DPCCH SIR and check if the DPCCH SIR is greater or lower than the SIR target.
504. If the DPCCH SIR is lower, then a TPC "up" command is sent and if DPCCH SIR is higher,
    505. Estimate DPCCH power. The estimation may be done based on pilot bits.
506. Estimate the received power for (all) the E-DPDCH(s).
507. Estimate the used TB size or E-TFCI.
    The quotient between the received power for (all) the E-DPDCH(s) and the received power for the DPCCH could be used to estimate the TB size or the E-TFCI, since each TB size value corresponds to a quotient between the transmitted power for (all) the E-DPDCHs and the transmitted power for the DPCCH, as specified in the "Setting of the uplink E-DPCCH and E-DPDCH powers relative to DPCCH power" procedure in 3GPP TS 25.214, "Physical layer procedures (FDD) (Release 6)" and in 3GPP TS 25.321, "Medium Access Control (MAC) protocol specification" and in the "E-TFC selection" procedure in 3GPP TS 25.321, "Medium Access Control (MAC) protocol specification"
508. Set SIR target according to the estimated TB size or the E-TFCI.
509. Compute the DPCCH SIR and check if the DPCCH is greater or lower than SIR target.
510. Send the TPC command.

In an alternative embodiment of the invention, when the E-TFCI cannot be decoded in the non-serving base station, the received TB size may be assumed to be the same as the one corresponding to the last correctly decoded E-DPCCH instead of basing the TB size estimate on power estimates as described in step 507 above.

If the E-TFCI is not decoded correctly at the serving base station, several alternative actions may be taken:

The DPCCH SIR target may be adjusted according to the granted rate. If the UE is instead transmitting at a different rate, always a lower rate, and the DPCCH SIR target is not set correctly, the DPCCH SIR and the E-DPDCH will increase to a larger value than intended. It may also be assumed that the received TB size is the same as the one sent in the previous TTI. Further, it is also possible to do as when the E-TFCI was not correctly decoded at the non-serving base station as described earlier.

It should be noted that this may cause a renegotiation of the granted rate.

Accordingly, the embodiments of the present invention solve the problem of maintaining a reliable power control in SHO when the DPCCH power is boosted according to the data rate.

Figure 3:
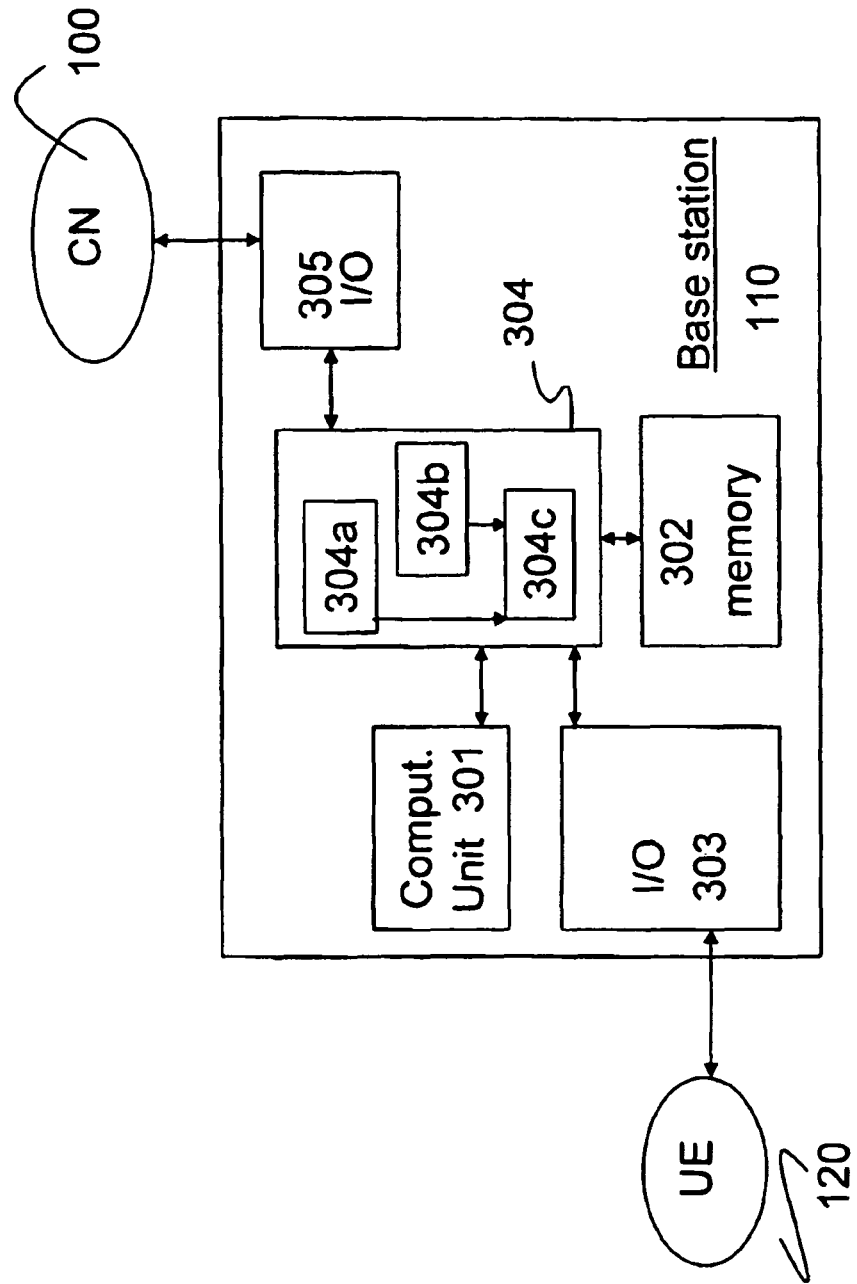
FIG. 3 illustrates schematically in a block diagram of a radio base station according to embodiments of the present invention.

FIG. 3 illustrates a radio base station 110a; 110b according to embodiments of the present invention. The radio base station 110a; 110b comprises at least one computational unit 301 and at least one memory 302 (volatile and/or non-volatile). It comprises further a communication interface 303 towards the UE and a communication interface 305 towards the RNC 100. It further comprises functions/components 304 required by the present invention, wherein the functions/components 304 can interact with the memory 302, computational unit 301 and interfaces 303, 305. The base station is arranged to adjust a signal to interference ratio (SIR) target depending on the amount of change of power applied. A power control command is sent to the UE 120 and the system processes the power control commands according to standard procedures. There are different ways of taking a decision to adjust the SIR target depending on situation. The function/components 304 required by the present invention comprises means for using a first SIR target (SIR target A) for the DPCCH power 304a used by said UE, means for detecting 304b a change of the UE data transmission rate on the E-DPDCH, and means for adjusting 304c the first SIR target (SIR target A) for the DPCCH power to a second SIR target (SIR target B) for the DPCCH power used by the UE based on a pre-determined mapping between a new UE data transmission rate and the SIR target.

The present invention may be implemented as software in a computational unit in the base station or as part of an ASIC (application specific integrated circuit) in the base station.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be implemented at least in part by means of both hardware and software, and that several "means", "units" or "devices" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

The invention claimed is:

1. A method for a first radio base station of a mobile telecommunication network for controlling power of a Dedicated Physical Control Channel, DPCCH, used by a user equipment, UE, connected to said first radio base station and to a further radio base station, wherein the UE is configured to transmit data on one or several Dedicated Physical Data Channels, E-DPDCH, and to transmit reference information for channel estimation on a DPCCH, and the method comprises the steps of:
   using a first SIR target for the DPCCH power used by said UE,
   detecting a change of the UE data transmission rate on the E-DPDCH, and
   adjusting the first SIR target for the DPCCH power to a second SIR target for the DPCCH power used by the UE based on a pre-determined mapping between a new UE data transmission rate on the E-DPDCH and the second SIR target for the DPCCH power, wherein the adjusting step comprises the steps of:
      estimating a Transport Block size indicative of the data transmission rate for the transmitted data to the Transport Block size of a previously sent Transport Block, and
      mapping the new transmission rate to the second SIR target,
   wherein the estimating and mapping steps comprise the steps of:
      estimating a Transport Block size indicative of the data transmission rate for the transmitted data to a lowest possible Transport Block size indicative of a data transmission rate,
      mapping the new estimated transmission rate to the second SIR target,
      determining the SIR of the DPCCH used by said UE, if said SIR of the DPCCH used by said UE is below the second SIR target then the method comprises the step of sending a power up command to the UE, else if said SIR of the DPCCH used by said UE is above the second SIR target then the method comprises the further steps of:
      re-estimating the Transport Block size based on the estimated DPCCH power and the estimated E-DPDCH power,
      mapping the re-estimated Transport Block size to a third SIR target, if said SIR of the DPCCH used by said UE is below the third SIR target then the method comprises the step of sending a power up command to the UE else if said SIR of the DPCCH used by said UE is above the third SIR target then the method comprises the step of sending a power down command to the UE,
   wherein the first radio base station is acting as a non-serving radio base station to said UE.

2. A radio base station of a mobile telecommunication network for controlling power of a Dedicated Physical Control Channel, DPCCH, used by a user equipment, UE, connected to said radio base station and to a further radio base station, wherein the UE is configured to transmit data on one or several Dedicated Physical Data Channels, E-DPDCH, and to transmit reference information for channel estimation on a DPCCH, and the radio base station comprises: means for using a first SIR target (SIR target A) for the DPCCH power used by said UE, means for detecting a change of the UE data transmission rate on the E-DPDCH, and means for adjusting the first SIR target (SIR target A) for the DPCCH power to a second SIR target (SIR target B) for the DPCCH power used by the UE based on a pre-determined mapping between a new UE data transmission rate on the E-DPDCH and the second SIR target for the DPCCH power, wherein the means for adjusting further is configured to estimate a Transport Block size indicative of the data transmission rate for the transmitted data to the Transport Block size of a previously sent Transport Block, and to map the new transmission rate to the second SIR target, wherein the means for adjusting further is configured to: estimate a Transport Block size indicative of the data transmission rate for the transmitted data to a lowest possible Transport Block size indicative of a data transmission rate, map the new estimated transmission rate to the second SIR target, determine the SIR of the DPCCH used by said UE, send a power up command to the UE when said SIR of the DPCCH used by said UE is below the second SIR target, re-estimate the Transport Block size based on the estimated DPCCH power and the estimated E-DPDCH power, map the re-estimated Transport Block size to a third SIR target if said SIR of the DPCCH used by said UE is above the second SIR target, send a power up command to the UE if said SIR of the DPCCH used by said UE is below the third SIR target, and to send a power down command to the UE if said SIR of the DPCCH used by said UE is above the third SIR target and wherein the radio base station is configured to act as a non-serving radio base station to said UE.

* * * * *

UNITED STATES PATENT AND TRADEMARK OFFICE
CERTIFICATE OF CORRECTION

| | | |
|---|---|---|
| PATENT NO. | : 8,489,138 B2 | Page 1 of 1 |
| APPLICATION NO. | : 12/517859 | |
| DATED | : July 16, 2013 | |
| INVENTOR(S) | : Bergman et al. | |

It is certified that error appears in the above-identified patent and that said Letters Patent is hereby corrected as shown below:

In the Drawings:

In Fig. 3, Sheet 4 of 6, for Tag "100", in Line 1, delete "CN" and insert -- RNC --, therefor.

In Fig. 5, Sheet 6 of 6, for Tag "503", in Line 3, delete "SNR" and insert -- SIR --, therefor.

In the Specification:

In Column 4, Line 58, delete "(WI)" and insert -- (TTI) --, therefor.

In Column 5, Line 65, delete "higher," and insert -- higher. --, therefor.

In Column 6, Line 17, delete "specification"" and insert -- specification". --, therefor.

Signed and Sealed this
Thirty-first Day of December, 2013

Margaret A. Focarino
*Commissioner for Patents of the United States Patent and Trademark Office*